United States Patent Office 3,066,141
Patented Nov. 27, 1962

3,066,141
QUINOLINE-TYPE MUSTARDS AND PROCESS FOR PRODUCING SAME
Ralph Jones, Jr., Miami, Fla., and Charles C. Price, Lansdowne, and Achintya K. Sen, Philadelphia, Pa., assignors to the United States of America as represented by the Secretary of the Army
No Drawing. Filed Apr. 26, 1957, Ser. No. 655,452
7 Claims. (Cl. 260—279)

The present invention provides a new group of chemical compounds which have properties indicative of potential benefit in chemotherapeutic treatment of certain forms of malignancies including leukemia and ascites tumors. Such compounds are classed generically as quinoline mustards and quinacrine mustard. More particularly, the present invention deals with the synthesis of chloroquine mustard, 2-methylchloroquine mustard, hexylchloroquine mustard, and quinacrine mustard, as set forth in the following specification, the effects of which compounds in the chemotherapy of various types of malignancies are also described in the said following specification.

Proceeding then directly to the synthesis of these new compositions of matter, the synthesis of chloroquine mustard will be described first as Part I, in the consideration of which it will be understood that all data of melting and boiling points are uncorrected, and that microanalyses were carried out by Micro Tech Laboratories, Skokie, Illinois, and Drs. Weiler and Strauss, Oxford, England.

The procedures for the respective syntheses are indicated by the following illustrative examples, variations in specific procedural details as may become suggested to one skilled in the art being permissible without departing from the spirit and scope of the invention.

PART I.—CHLOROQUINE MUSTARD

A. *5-bis(β-hydroxyethyl)amino-2-pentanone.*—A mixture of 210 gms. (2.0 moles) of diethanol amine and 120 gms. (1.0 mole) of 5-chloro-2-pentanone in 500 ml. of absolute ethanol was gently refluxed for forty-eight hours. The volatile material then was removed by warming on a water bath under water pump suction. The residual mass was cooled, treated with 160 ml. of water and the solution was extracted four times with 100-ml. portions of chloroform. The combined chloroform extracts were dried over anhydrous magnesium sulphate and the chloroform was distilled off on a steam bath, the last traces being removed under reduced pressure. The residual crude aminoketone, which was obtained as a viscous oil, weighed 113.5–120 gms. (60–63.5%).

In the above stage of the procedure, the 5-chloro-2-pentanone employed was prepared from α-acetyl-γ-butyrolactone (Merck) essentially in accordance to the procedure given in Organic Syntheses, vol. 31, p. 74 (1951) article by G. W. Cannon, R. C. Ellis, and J. R. Leal.

The crude aminoketone may be distilled under nitrogen in a short-path distillation apparatus and a moderate bath temperature (250–265°) to afford a colorless oil, B.P. 148–150° (0.1 mm.) $n_D^{29}$ 1.4739 and $d_4^{20}$ 1.0592. The yield of the distilled ketone based on the crude ketone was 75–88%.

*Analysis.*—Calcd. for $C_9H_{19}O_3N$: C, 57.11; H, 10.12; N, 7.40. Found: C, 56.90; H, 10.07; N, 7.28.

B. *5-bis(β-hydroxyethyl)amino-2-pentanone oxime.*—A 30 gm. (0.158 mole) sample of the aminoketone obtained from (A) above, was added in portions to a chilled solution of 11.2 gms. (0.16 mole) of hydroxylamine hydrochloride in 20 ml. of water. The solution was refluxed gently for thirty minutes and then kept overnight. After addition of 30 ml. of water, the solution was cooled, saturated with anhydrous potassium carbonate, and extracted four times with 75-ml. portions of chloroform. The combined extracts were dried over magnesium sulfate and the chloroform was removed by distillation on a steam bath, the last traces being removed under reduced pressure, leaving the crude oxime as a thick brown syrup weighing 26.5–30.3 gms. (77.2 to 93.9%). This crude oxime can be distilled under reduced pressure in a yield of 84%, B.P.175–178° (0.1 mm.); $n_D^{30}$ 1.4984.

The picrate of the oxime was prepared in the following manner: An excess of picric acid (saturated solution of picric acid in ethanol) was added to about 1 gm. of the oxime. On keeping overnight in the refrigerator, the picrate crystallized out as yellow needles (M.P. 103–104°). Recrystallization from absolute ethanol yielded the pure picrate, M.P. 105–106°.

*Analysis.*—Calcd. for $C_{15}H_{23}N_5O_{10}$: C, 41.57; H, 5.31; N, 16.16. Found: C, 41.90; H, 5.23; N, 15.70.

C. *5-bis(β-hydroxyethyl)amino - 2 - aminopentane.*—The above oxime (from (B) above), 20.4 gms. (0.1 mole) dissolved in 50 ml. of 95% ethanol, was hydrogenated at 70° over Raney nickel at an initial hydrogen pressure of 2000 p.s.i. The hydrogen consumption was completed in about an hour. The catalyst was filtered off, the ethanol removed by distillation, and the residue distilled under reduced pressure; the fraction boiling at 140–160°/0.5 mm. was collected; yield 15–17 gms. (79–89%). The product was further purified by refractionation. The portion boiling at 150°/0.5 mm. was collected in a yield of 75–82%.

In the foregoing procedure (C), it has been found to be advantageous to use freshly-prepared Raney nickel catalyst. In some experiments, a pressure of 800 p.s.i. was used and hydrogenation was complete in about two hours. In some cases, undistillable polymeric material was left as a residue, the quantity of which depends upon the quality of catalyst used.

The diamine obtained in the above procedure analyzed as follows:

*Analysis.*—Calcd. for $C_9H_{22}N_2O_2$: C, 56.80; H, 11.65. Found: C, 57.21; H, 11.61.

The picrate of the diamine, separated out from an ethanolic solution (seeding) was crystallized from a mixture of ethyl acetate and ethanol, M.P. 96–98°.

*Analysis.*—Calcd. for $C_{15}H_{25}N_5O_9$: C, 42.95; H, 6.01; N, 16.70. Found: C, 43.19; H, 5.98; N, 16.71.

D. *7 - chloro-4-(4-bis(β-hydroxyethyl)amino-1-methylbutylamino)-quinoline (chloroquine diol).*—A mixture of 9.4 gms. (0.1 mole) of phenol, 9.5 gms. (0.05 mole) of the above diamine, prepared according to procedure (C) above, and 9.9 gms. (0.05 mole) of 4,7-dichloroquinoline (Sterling-Winthrop Research Institute) was stirred and heated at 125° for 24 hours. The mixture was cooled to room temperature, and a mixture of 10 ml. of acetic acid and 20 ml. of water added. After stirring until complete solution was effected, the solution was cooled, made just alkaline with ammonia and extracted with one 100-ml. and four 50-ml. portions of ether. The aqueous layer was made strongly alkaline with ammonia and extracted with one 100-ml. and four 50-ml. portions of chloroform. The combined chloroform extracts were dried over potassium carbonate for two hours and chloroform removed as before. The residual oily 7-chloro-4-(4-bis(β-hydroxyethyl) amino-1-methylbutylamino)-quinoline weighed 12–12.8 gms. (68–72%).

Chloroquine diol was induced to crystallize by keeping under ether at −10° for several days with occasional trituration; M.P. 65–67° with previous softening at 30°.

The picrate of chloroquine diol was prepared by adding a saturated ethanolic solution to a solution of the diol in a mixture of ethyl acetate and ethanol from which it separated on standing. After crystallization from ethanol, it melted at 156–157°.

*Analysis.*—Calcd. for $C_{30}H_{32}ClN_9O_{16}$: C, 44.48; H, 3.98; N, 15.56. Found: C, 43.86; H, 4.09; N, 15.61.

E. *7-chloro-4-(4-bis(β-chloroethyl)amino - 1 - methylbutylamino)-quinoline dihydrochloride (chloroquine mustard dihydrochloride).*—A solution of 6.8 gms. (0.057 mole) of thionylchloride in 12 ml. of dry chloroform was added during one hour to a solution of 10 gms. (0.284 mole) of 7-chloro - 4 - (4-bis(β-hydroxyethyl) amino-1-methylbutylamino)-quinoline from (D) above, in 30 ml. of dry chloroform in a 200 ml., 3-necked flask kept immersed in an ice-salt bath and provided with a mercury-sealed stirrer, condenser, and funnel. After the addition was over, the mixture was stirred at that temperature for thirty minutes more and then one hour on an oil bath at 70–75°. After cooling and adding 20 ml. of absolute ethanol, the mixture was stirred until complete solution was effected. The solution was diluted with 300 ml. of dry ether and kept overnight in the refrigerator. Supernatant liquid was decanted from the pasty mass which, on trituration with fresh ether, transformed to a granular solid. The solid was washed by decantation several times with fresh dry ether. It was then filtered, washed with fresh dry ether, and dried in a vacuum desiccator. The dihydrochloride of the chloroquine mustard weighed 9.3–10 gms. (70–76%). The compound decomposed above 60°, but the point is not sharp and definite.

A typical run of chloroquine mustard dihydrochloride gave the following analytical results:

*Analysis.*—Calcd. for $C_{18}H_{24}Cl_3N_3 \cdot 2HCl$: C, 46.82; H, 5.68; N, 9.10; Cl. 38.40. Found: C, 45.15; H, 5.90; N, 8.60; Cl, 38.05.

Ionic chlorine, estimated conductimetrically by titration with silver nitrate both before and after treatment with alkali, gave the following results:

Before alkali treatment $C_{18}H_{24}Cl_3N_3 \cdot 2HCl$ requires: Cl, 15.38. Found: Cl, 15.00 to 15.57 (different runs).

After alkali treatment $C_{18}H_{24}Cl_3N_3 \cdot 2HCl$ requires: Cl, 30.72. Found: Cl, 27.70 to 29.36 (different runs).

F. *Chloroquine mustard pamoate.*—(a) To a suspension of 4.2 gms. (0.0108 mole) of methylene bis(2-hydroxy-3-naphthoic acid), obtained as noted below, in 82 ml. of water and 2 drops of phenolphthalein, 10% aqueous sodium hydroxide solution was added until just alkaline. The solution was filtered and kept.

(b) Chloroquine mustard dihydrochloride prepared from (E) above, 5 gms. (0.0108 mole) was dissolved in 50 ml. of water, a drop or two of concentrated hydrochloric acid was added until the mixture was acidic to Congo red paper and filtered.

The solution in (b) then was added to the solution in (a) all at once and stirred vigorously. Voluminous solid precipitated. After standing with occasional stirring for 15 minutes, this was filtered, washed thoroughly with water, and dried in a vacuum desiccator.

*Analysis.*—Calcd. for $C_{41}H_{40}N_3O_6Cl_3$: C, 63.3; H, 5.14; N, 5.41; Cl, 13.69. Found: C, 63.46; H, 5.34; N, 5.26; Cl, 11.32.

The methylene bis(2-hydroxy-3-naphthoic acid) in (a) above, was obtained as follows: In a one-liter flask provided with a stirrer and placed on a water bath, 50 gms. of 2-hydroxy-3-naphthoic acid were dissolved in 500 gms. of acetic acid. During the reaction, the temperature was maintained at 90–100°. To the well-stirred solution, a solution of 30 gms. of 40% formaldehyde in 50 gms. of acetic acid and 2 gms. of concentrated sulphuric acid, heated to water bath temperature, was added in a narrow unified stream. In a short time the liquid becomes cloudy and crystals begin to appear. After stirring for 30 minutes more, the mixture was cooled and filtered by suction. The product was boiled twice with 100 ml. of acetic acid and once with water, filtered, washed with water, and dried to constant weight at 100–110°; yield 45 gms. (90%).

The principal reactions involved in the synthesis of chloroquine mustard, in connection with the foregoing stages of the preparation, may be summarized as follows:

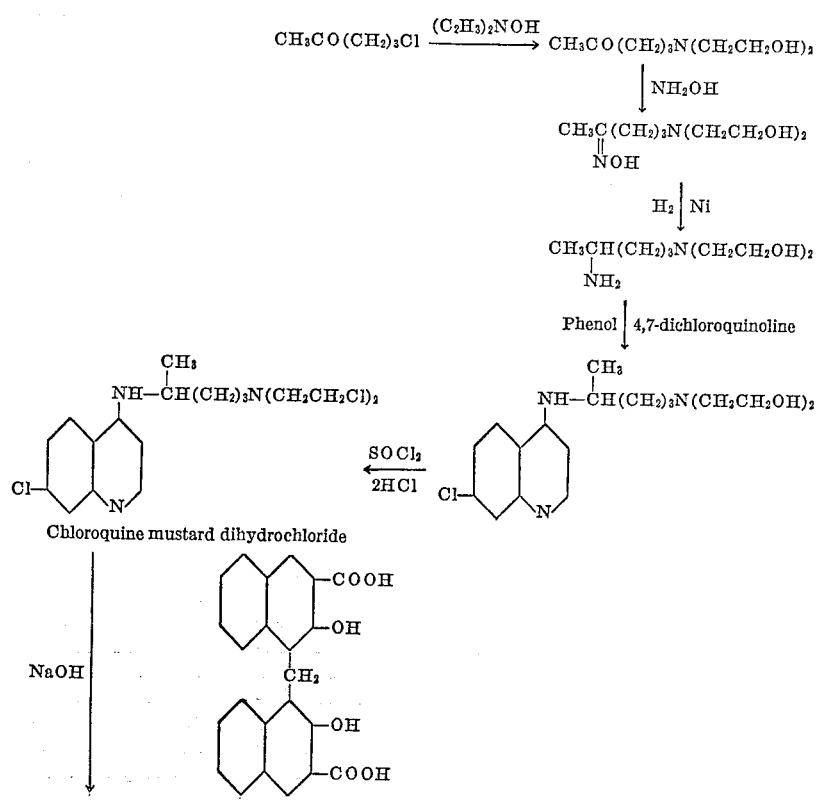

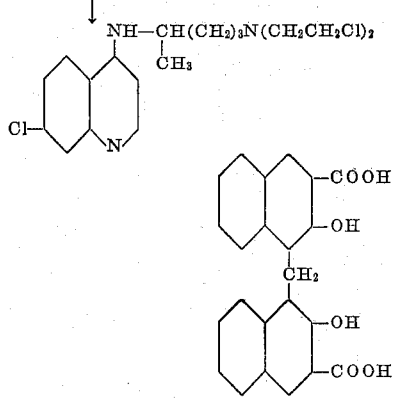

Chloroquine mustard pamoate

PART II.—2-METHYLCHLOROQUINE MUSTARD

A. *2-methylchloroquine mustard pamoate.*—7-chloro-2-methyl-4-(4-bis($\beta$-hydroxyethyl)amino-1-methylbutylamino)quinoline was prepared according to the procedure given above for chloroquine analog from 9.4 gms. (0.05 mole) of the diamine and 10.6 gms. (0.05 mole) of 2-methyl-4,7-dichloroquinoline (M.P. 103–105°) in the presence of 0.10 mole of phenol; yield, 12.5–13 gms. (71–72%). The diol, dissolved in 38 ml. of dry chloroform, was treated with 5.2 ml. of thionyl chloride in 10 ml. of dry chloroform and worked up as described above in the preparation for chloroquine mustard dihydrochloride; yield, 15 gms. (89%). The dihydrochloride was then converted to the pamoate salt by treatment with methylene bis-(2-hydroxy-3-naphthoate) in a similar way to that of conversion to chloroquine mustard pamoate in a yield of 90%, M.P. 209–212° (decomposes with early shrinkage and sintering).

2-methylchloroquine mustard pamoate gave the following results on analysis:

*Analysis.*—Calcd. for $C_{42}H_{42}N_3Cl_3O_6$: C, 63.75; H, 5.35; N, 5.31; Cl, 13.45. Found: C, 62.35; H, 5.72; N, 4.93; Cl, 10.57.

The reactions involved in the above-described synthesis of 2-methylchloroquine mustard pamoate may be indicated empirically as follows:

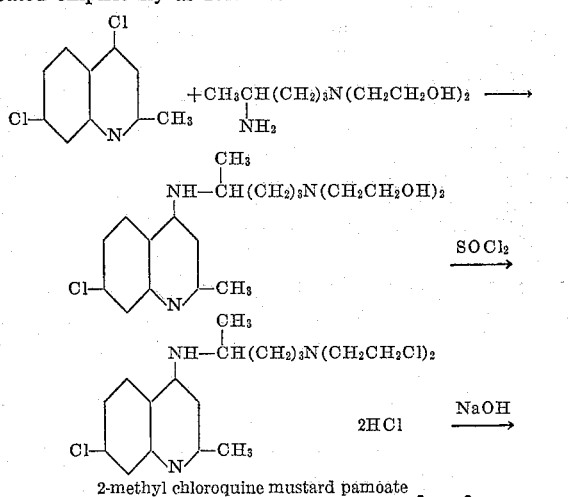

2-methyl chloroquine mustard pamoate

PART III.—HEXYLCHLOROQUINE MUSTARD

A. *5-bis($\beta$-hydroxyethyl)aminocapronitrile.*—A mixture of 44.0 gms. (0.25 mole) of $\epsilon$-bromocapronitrile and 52.5 gms. (0.5 mole) of diethanol amine in 100 ml. of absolute ethanol was heated under reflux for 48 hours. The solvent then was removed under reduced pressure. The residual mass was cooled, treated with 25 ml. of cold water and the solution was extracted with one 100-ml. and four 40-ml. portions of chloroform. The combined chloroform extracts were dried over magnesium sulphate. The solvent was removed and the residual oil was distilled under reduced pressure. The yield of 5-bis($\beta$-hydroxyethyl)aminocapronitrile, B.P. 167–172°, (0.1 mm.), was 25 gms. (50% based on nitrile). On redistillation the product had a B.P. of 162° (0.08 mm.); $n_D^{30}$ 1.4744.

In the above, $\epsilon$-bromocapronitrile, B.P. 115–117°, (6 mm.) was prepared in six steps, starting from cyclohexanone as described by D. S. Breslow and C. R. Hauser, J.A.C.S., 67, 686, (1945).

The 5-bis($\beta$-hydroxyethyl)aminocapronitrile obtained in accordance with procedure (A) above, gave the following results on analysis:

*Analysis.*—Calcd. for $C_{10}H_{20}N_2O_2$: C, 59.98; H, 10.06; N, 13.99. Found: C, 60.09; H, 9.94; N, 14.00.

B. *6-bis($\beta$-hydroxyethyl)amino-1-aminohexane.*—A mixture of 20 gms. (0.1 mole) of 5 bis($\beta$-hydroxyethyl)aminocapronitrile, obtained from (A) above, and 3 gms. of Raney nickel in 50 ml. of absolute ethanol and 5 ml. of 10% alcoholic ammonia was shaken with hydrogen at 50 p.s.i. The theoretical amount of hydrogen was taken up in five hours. The catalyst was filtered off, solvent removed, and the residue distilled under reduced pressure. The yield of 6-bis($\beta$-hydroxyethyl)amino-1-aminohexane, B.P. 155–157° (0.3 mm.), was 14.0 gms. (75%). On redistillation, the product had a boiling point of 153° (0.2 mm.); $n_D^{26}$ 1.4885.

This 6-bis($\beta$-hydroxyethyl)amino-1-aminohexane gave the following results on analysis:

*Analysis.*—Calcd. for $C_{10}H_{24}N_2O_2$: C, 58.79; H, 11.84; N, 13.72. Found: C, 58.86; H, 11.74; N, 13.78.

C. *7-chloro-4-(6-bis($\beta$-hydroxyethyl)aminohexyl)-aminoquinoline.*—The method of preparation was the same as that described for chloroquine diol, Part I, (D) above. For final extraction, two 100-ml. and six 60-ml. of chloroform were used, as the present compound was not very soluble at ordinary temperatures. After removal of chloroform, the residue in the flask solidified en masse and was recrystallized from the same solvent (yield 60%, M.P. 126–127°).

This 7-chloro-4-(6-bis($\beta$-hydroxyethyl)aminohexyl)-aminoquinoline had the following analytical results:

*Analysis.*—Calcd. for $C_{19}H_{28}N_3ClO_2$: C, 62.36; H, 7.71; N, 11.48; Cl, 9.69. Found: C, 62.03; H, 7.75; N, 11.60; Cl, 11.60.

D. *7-chloro-4(6-bis($\beta$-chloroethyl)aminohexylamino)-quinoline dihydrochloride.*—The above diol was connected to the mustard derivative in the same way as that described for chloroquine mustard, Part I, (E) above. The crude compound, which was very hygroscopic and which decomposed slowly over 70°, was recrystallized from absolute ethanol-acetone mixture. The recrystalized product, which was not hygroscopic, melted at 175–176°. This hexyl chloroquine mustard gave the following result on analysis:

Analysis.—Calcd. for $C_{19}H_{28}N_3Cl_5$: C, 47.96; H, 5.93; N, 8.83; Cl, 37.28. Found: C, 48.20; H, 6.09; N, 8.66; Cl, 35.98.

The principal foregoing reactions may be indicated empirically as follows:

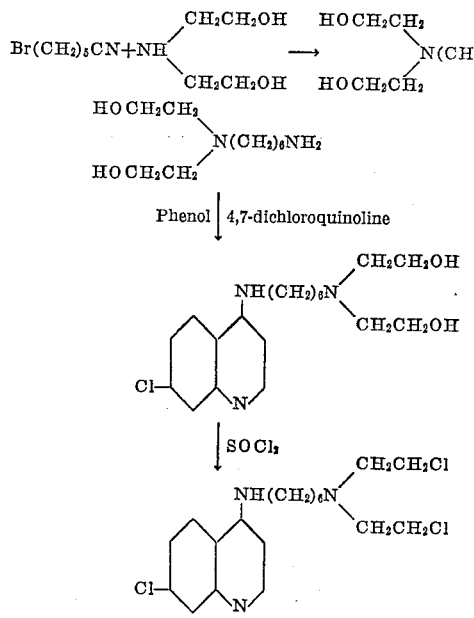

PART IV.—QUINACRINE MUSTARD

A. *2 - methoxy - 6 - chloro-9-(4-bis(β-hydroxyethyl)-amino - 1-methylbutyl-amino)acridine dihydrochloride.*—To a solution of 5.6 gms. (0.02 mole) of 2-methoxy-6, 9-dichloroacridine, (supplied by Eastman Organic Chemicals) in 24 gms. of phenol, 3.8 gms. (0.02 mole) of the diamine were added and the mixture was heated with occasional shaking on a steam bath for five hours. The cooled solution then was poured into 150 ml. of cold 10% aqueous sodium hydroxide solution and the product extracted with chloroform. The organic layer then was extracted with dilute acetic acid. The acid solution was made alkaline with ammonia, and again extracted with chloroform. The chloroform solution was dried with potassium carbonate for two hours and chloroform removed. The residual highly viscous oil was the free base and weighed 6 gms. (70%).

To a solution of a portion of the above base in 95% ethanol, concentrated hydrochloric acid was added until acidic to Congo red and the hydrochloride was precipitated by the addition of free ether. The crude hydrochloride was purified by crystallization from ethanol-ether mixture, and was found to have a melting point of 209–210°.

Analysis.—Calcd. for $C_{23}H_{30}N_3ClO_3 \cdot 2HCl \cdot H_2O$: C, 52.82; H, 6.55; N, 8.03. Found: C, 52.55; H, 6.70; N, 7.94.

B. *2 - methoxy - 6 - chloro-9-(4-bis(β-chloroethyl)amino - 1-methylbutylamino)acridine dihydrochloride.*—The method of preparation was the same as that described for chloroquine mustard, Part I (E) above; yield, 97%. For crystallization, a portion was dissolved by stirring in absolute ethanol. Dry acetone was added until turbidity, and after keeping at −10° for a week, the yellow crystals were collected. On heating, these soften at 110° and then slowly begin to decompose.

The quinacrine mustard gave the following results on analysis:

Analysis.—Calcd. for $C_{23}H_{30}N_3Cl_5O$: C, 50.99; H, 5.58; N, 7.75; Cl, 32.72. Found: C, 51.29; H, 5.78; N, 8.39; Cl, 32.45.

The principal foregoing reactions may be indicated empirically as follows:

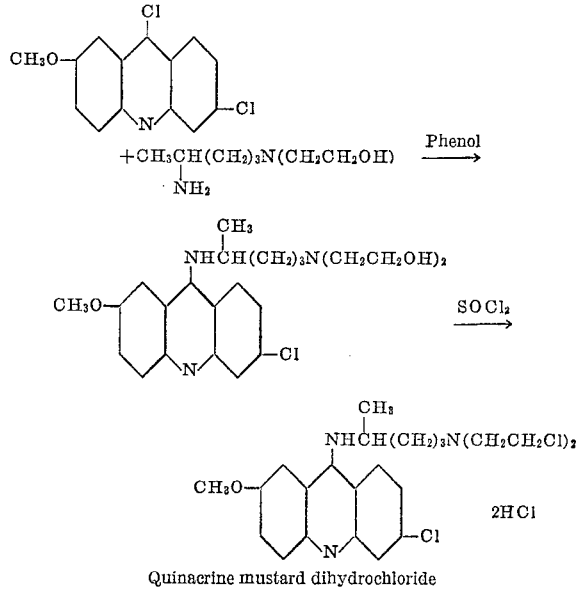

Quinacrine mustard dihydrochloride

PART V.—STUDIES OF CHEMOTHERAPEUTIC ACTIVITY IN MICE

A. *Chemotherapeutic activity against ascites tumors in the mouse.*—The methods used in these studies are identical with those reported by Hugh J. Creech, et al. in Cancer Research, Supplement No. 3, 1955, pages 47 through 51, entitled "VIII.—Studies with Four Distinct Lines of the Ehrlich Ascites Tumor for the Evaluation of Twenty-Seven Potential Inhibitors." A summary of the results of studies comparing the effect of chloroquine mustard, 2-methylchloroquine mustard, hexylchloroquine mustard, and quinacrine mustard with that of nitrogen mustard on the survival of Swiss mice inoculated with the Ehrlich ascites tumor is shown in Table I below. The results are recorded of the percent of animals that survived two times, three times, and seven times the mean survival time of control animals. Compounds of known activity against cancer in experimental animals and in man, such as amethopterin, 6-mercaptopurine, urethane, etc. yield zero results in such a table.

TABLE I

*Survival Data on Swiss Mice With Ehrlich Ascites Tumor*

| Compound | Number mice | Dose,[1] uM/kg. | Percent survival at X times control mean | | |
|---|---|---|---|---|---|
| | | | 2X | 3X | 7X |
| Nitrogen mustard HCl | 114 | 5 | 80 | 60 | 2[2] 0 |
| Chloroquine mustard napthoate | 54 | 10 | 90 | 75 | 20 |
| 6-MeO-chloroquine mustard HCl | 36 | 2 | 60 | 40 | 20 |
| 2-methyl chloroquine mustard napthoate | 28 | 5–25 | 70 | | (3) |
| Quinacrine mustard HCl | 68 | 2 | 70 | 55 | 20 |

[1] Dose in millimoles to eliminate factor of different salts.
[2] No survivors.
[3] Not completed.

NOTE.—Inoculum=7 or 18 M cells; treatment I.P. on days 1, 2, 3 after inoculation.

The effectiveness of the three quinoline derivatives and of quinacrine mustard in increasing the survival time of these mice was equivalent to the effect of nitrogen mustard. The molar concentration of chloroquine mustard napthoate required to produce this effect was approximately twice that of nitrogen mustard. The 2-methoxy derivative of chloroquine mustard and also quinacrine mustard produced effects equivalent to nitrogen mustard in slightly less than half the molar concentration. A comparison of the effect of the naphthoate salt of the methyl-bis-beta-chlorethylamine derivative of the 8-aminoquinoline pamaquin (pamaquin mustard) with that of nitrogen mustard and of three aromatic mustard analogues is shown in Table II, below. All four aromatic mustard derivatives produced therapeutic effects approximately equivalent to those of nitrogen mustard, but the molar concentration required to produce these effects was 5 to 10 times that of nitrogen mustard.

TABLE II

*Survival Data on Swiss Mice with Ehrlich Ascites Tumor*

| Compound | Number mice | Dose, uM./kg. | Percent survival at X times control mean | | |
|---|---|---|---|---|---|
| | | | 2X | 3X | 7X |
| Nitrogen mustard | 114 | 5 | 80 | 60 | 0 |
| l-phenyl alanine mustard | 80 | 25–50 | 90 | 70 | 30 |
| d-Phenyl alanine mustard | 60 | 50–60 | 85 | 70 | 30 |
| Phenyl buteric mustard (CB1348) | 56 | 35–60 | 50 | 40 | 0 |
| Pamaquine mustard napthoate | 26 | 50–60 | 60 | 40 | |

NOTE.—Inoculum=7 or 18 M cells; treatment on days 1, 2, 3 after inoculation.

A summary of the results of studies of the effects of these compounds against four different ascites tumors in Swiss mice is shown in Table III, below. In this table, the headings "EF" and "ELD" indicate the fast and slow killing clones with the Ehrlich ascites tumor. S–37 is sarcoma–37 in ascites form and $K_2$ is the Krebs carcinoma growing in ascites form.

TABLE III

*Survival Data on Swiss Mice With Ascites Tumors*

| Compound | uM./kg. | EF | ELD | S–37 | $K_2$ |
|---|---|---|---|---|---|
| Nitrogen mustard | 5 | +++ | ++ | +++ | +++ |
| l-phenyl alanine mustard | 25–50 | +++ | +++ | +++ | +++ |
| d-Phenyl alanine mustard | 50–60 | +++ | + | ++ | |
| Phenyl buteric mustard (CB1348) | 35–60 | ++ | | | + |
| Pamaquine mustard napthoate | 50–60 | ++ | +++ | – | +++ |
| Chloroquine mustard napthoate | 10 | +++ | + | + | + |
| Quinacrine mustard hydrochloride | 2 | ++ | | ++ | +++ |

NOTE.—Inoculum=14–21 M cells; treatment on days 1, 2, and 3 after inoculation. Percent surviving at twice mean survival time for controls, + 20–49%; ++ 50–75%; +++ >75%.

Pamaquine mustard has shown a high degree of therapeutic activity against three of the four ascites tumors, but little or no activity against sarcoma–37. Chloroquine mustard has shown a high degree of therapeutic activity against the slow-killing clone of the Ehrlich ascites tumor and less activity against the other three ascites tumors. Quinacrine mustard has shown a high degree of therapeutic activity against three to four ascites tumors, and studies against the ELD tumor are not as yet complete.

These studies have demonstrated that the quinoline and acridine mustards exhibit therapeutic activity against malignant tumors growing in the ascites form that is approximately equivalent to that of nitrogen mustard. The parent compounds, pamaquin, chloroquine, and quinacrine have no therapeutic activity against these tumors.

B. *Chemotherapeutic activity against leukemia and sarcoma 180 in the mouse.*—A summary of two experiments in which the effect of pamaquin mustard, chloroquine mustard, and quinacrine mustard was compared with that of amethopterin on AK–9 leukemia in $AKxC_3H_{F_1}$ hybrid mice is shown in Table IV below. Amethopterin has consistently produced a four to eight day increase in the average survival of mice with this leukemia and is used as the standard of reference. There has been no ability to demonstrate any therapeutic activity of nitrogen mustard against this leukemia. Pamaquin mustard and chloroquine mustard have been shown to produce a small but significant increase in survival time of mice with this leukemia. Results with quinacrine mustard have been variable, but in several experiments, like those shown in Table IV below, the drug has exhibited therapeutic activity equal to or slightly greater than that of amethopterin.

TABLE IV

*Effect of Aromatic Mustards on AK Leukemia–9 in $AKxC_3H_{F_1}$ Mice*

| Compound | Number of mice | Daily dose mg./kg. | Average survival treated/controls | Diff. P.E.± | C.R. |
|---|---|---|---|---|---|
| Amethopterin | 40 | 3.75 | 16.8/10.6 | 6.2±1.1 | 6.0 |
| Pamaquin [1] mustard | 20 | 17.5 | 12.2/10.1 | 2.1±0.41 | 5.1 |
| Chloroquine [2] mustard | 20 | 3.3 | 12.6/ 9.5 | 3.1±0.38 | 8.2 |
| Quinacrine [2] mustard | 20 | 1.0 | 19.6/10.8 | 8.8±0.8 | 11.0 |

[1] Pamoate salt.   [2] Hydrochloride salt.

This leukemia originated spontaneously in the colony of inbred AK mice and has been used for more than a year and a half in chemotherapeutic studies. The results of an experiment comparing the effect of quinacrine mustard and chloroquine mustard with that of four other alkylating agents of established therapeutic value on sarcoma 180 in $C_3HxAK_{F_1}$ hybrid mice is shown in Table V, below. This tumor was obtained from Dr. Howard Skipper of the Southern Research Institute, Birmingham, Alabama. It is the tumor used in that institution in the contract screening program conducted under the auspices of the Cancer Chemotherapy National Service Center. The procedure followed in this experiment was identical with that used by Dr. Skipper in the contract screening program. In this experiment quinacrine mustard and chloroquine mustard produced an inhibition growth of the tumor that was approximately equivalent to that of the other four alkylating agents. Results are suggestive of limited chemotherapeutic activity.

TABLE V

*The Effect of Chloroquine Mustard on Sarcoma 180*

[Comparison with other alkylating agents]

| Drug | Daily dose mg./kg. | Number of animals | Tumor weight at 8 days | | | Av. weight change in gm. |
|---|---|---|---|---|---|---|
| | | | Range | Mean | Percent of controls | |
| Starch | Control | 12 | 297–649 | 475 | | +2.5 |
| Quinacrine mustard | 1.0 | 10 | 147–598 | 279 | 59 | –1.2 |
| HCl | 0.75 | 10 | 116–547 | 338 | 70 | –0.6 |
| Chloroquine mustard pamoate | 40.0 | 10 | 97–373 | 213 | 45 | +3.6 |
| Nitrogen mustard | 0.75 | 10 | 80–327 | 193 | 40 | –5.3 |
| Thio-TEPA | 1.4 | 10 | 119–668 | 300 | 63 | –0.6 |
| Myleran | 4.0 | 9 | 118–470 | 305 | 64 | +1.9 |
| Chlorambucil | 8.0 | 9 | 115–377 | 224 | 57 | –0.5 |

PART VI.—STUDIES OF CHEMOTHERAPEUTIC ACTIVITY IN RATS

The results of studies of the effect of chloroquine mustard and quinacrine mustard on the growth of the Yoshida sarcoma growing in the solid form in Fisher rats are summarized in Table VI, below. The pamoate salt of chloroquine mustard produced a significant decrease in the average tumor diameter at seven days and a significant increase in the average survival of the animals. This effect has been demonstrated repeatedly with various doses of chloroquine mustard pamoate and chloroquine mustard hydrochloride. The inhibition of the rate of growth is limited to the period of drug administration, and when treatment is discontinued the tumor continues to grow in treated animals. The difference in size between treated and control animals disappears by the end of the second or third week. Quinacrine mustard hydrochloride has consistently failed to show any evidence of therapeutic effect on this tumor.

TABLE VI

*The Effect of Chloroquine Mustard and Quinacrine Mustard on Yoshida Sarcoma (Solid) in the Rat*

| Drug | Dosage regimen | Number of animals | Average diameter of tumor at 7 days, mm. | Average survival, days |
|---|---|---|---|---|
| Saline | | 10 | 7.9±.91 | 21.2 |
| Chloroquine mustard pamoate. | 16 mgm./kg. x 2, 4 mgm./kg. x 10. | 10 | 1.9±.76 | 26.6 |
| Saline | | 10 | 17.8±2.2 | 19.5 |
| Quinacrine mustard hydrochloride. | 0.75 mgm./kg. q.o.d. x 7. | 10 | 18.8±2.4 | 18.8 |

A study of the effect of chloroquine mustard and quinacrine mustard on acute leukemia IRC/741 in Fisher line 344 rats is shown in Table VII, below. Chloroquine mustard in optimum dosage produced a significant increase in mean survival time of rats with this leukemia. The effect is sharply dependent upon dose and the dose response curve is steep. Quinacrine mustard has produced a smaller but significant increase in mean survival time in rats bearing this leukemia.

TABLE VII

*The Effect of Chloroquine Mustard and Quinacrine Mustard on Acute Leukemia IRC/741 in Fisher Line 344 Rats*

| Drug | Dosage regimen | Number of animals | Survival, days | | Increase in mean survival, days |
|---|---|---|---|---|---|
| | | | Mean | Range | |
| Saline | | 10 | 17.3 | 14-20 | |
| Chloroquine mustard hydrochloride. | 2 mgm./kg. b.i.d. x 2, 1 mgm./kg. q.o.d. x 10. | 10 | 23.3 | 18-29 | 6.0 |
| Chloroquine mustard hydrochloride. | 3 mgm./kg. x 2, 2 mgm./kg./day x 8. | ¹8 | 22.3 | 21-31 | 5.0 |
| Saline | | 10 | 16.3 | 14-20 | |
| Quinacrine mustard hydrochloride. | 1.1 mgm./kg./day x 13. | 10 | 19.4 | 18-22 | 3.1 |

¹ 2 toxic deaths.

Nitrogen mustard in optimum dosage produces an increase of eight to fourteen days in the mean survival time of rats with the leukemia. Thio-TEPA has produced up to 80% of cures of this leukemia and the results indicate that chlorambucil produces 80 to 100 percent of cures of this leukemia when administered in optimal dosage.

The results obtained indicate that chloroquine mustard and quinacrine mustard possess a high degree of chemotherapeutic activity against ascites tumors in the mouse and that this activity is approximately equivalent to that of nitrogen mustard. These compounds have been shown to have significant chemotherapeutic activity against the IRC acute leukemia in Fisher line 344 rats. The activity is less than that of nitrogen mustard, Thio-TEPA and chlorambucil. The evidence available a this time indicates that these compounds may have limited activity against sarcoma 180 in the mouse. Chloroquine mustard has been found to have chemotherapeutic activity against the Yoshida sarcoma in the rat.

The foregoing results are presented as evidence that chloroquine mustard has limited but definite chemotherapeutic activity. It has not been established that this is a practical therapeutic agent for the treatment of any form of human malignancy, but the evidence is sufficient to justify more extensive human studies.

The foregoing description sets forth the new compositions of matter and the preferred method of making and using the same. In connection with the new compositions of the instant invention, evidence has been presented which indicates that chloroquine mustard, quinacrine mustard and certain related compounds possess chemotherapeutic activity against certain malignant tumors in experimental animals. It will be understood that certain operational details in the preparation of the new compositions may be effected without departing from the inventive concept, as will be apparent to one skilled in this art; and accordingly it will be understood that it is intended and desired to embrace within the scope of this invention such modifications and changes as may be necessary or desirable to adapt it to varying conditions and uses, as defined by the appended claims.

Having thus described our invention, what we claim as new and wish to secure by Letters Patent is:

1. A compound, selected from the group consisting of chloroquine mustard dihydrochloride, 2-methylchloroquine mustard dihydrochloride, chloroquine mustard pamoate, 2-methylchloroquine mustard pamoate, hexylchloroquine mustard dihydrochloride, and quinacrine mustard dihydrochloride.

2. Chloroquine mustard dihydrochloride, having the formula

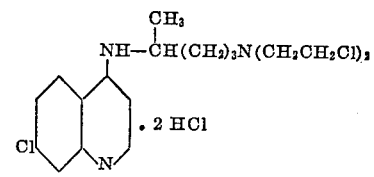

3. Chloroquine mustard pamoate, having the formula

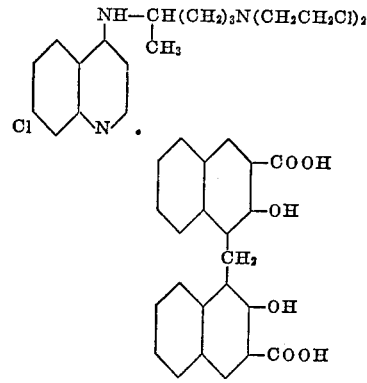

4. 2-methylchloroquine mustard dihydrochloride, having the formula

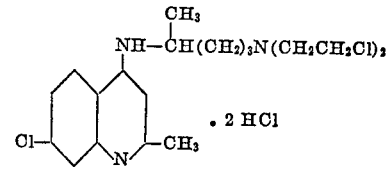

5. 2-methylchloroquine mustard pamoate, having the formula

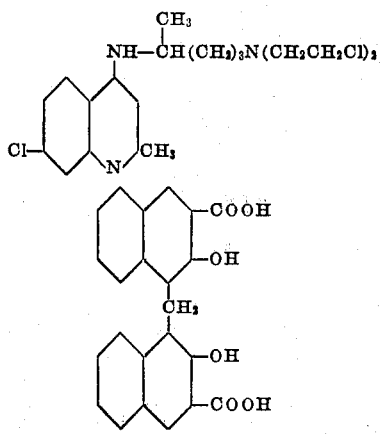

6. Hexylchloroquine mustard dihydrochloride, having the formula

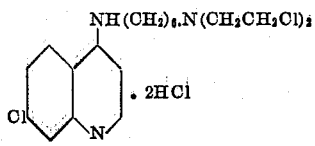

7. Quinacrine mustard dihydrochloride, having the formula

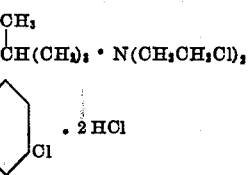

References Cited in the file of this patent

Reinhard et al.: Journ. Am. Med. Assoc., vol. 142, #6, pages 388–89 (November 11, 1950).
Journal Am. Med. Assoc., vol. 154, #11, page 916 (March 13, 1954).
Shimkin et al.: Annals Int. Med., vol. 42, #1, pp. 136 and 151–153 (Jan. 1955).
Shimkin et al.: Annals Int. Med., vol. 45, #2, pages 255–67, August 1956.
Journal Am. Med. Assoc., vol. 165, #15, page 2005 (Dec. 14, 1957).